United States Patent
Calia

(10) Patent No.: US 10,647,368 B2
(45) Date of Patent: May 12, 2020

(54) CHAIN JOINT ASSEMBLY

(71) Applicant: ITALTRACTOR ITM S.P.A., Fraz. Calcara di Crespellano (IT)

(72) Inventor: Eustachio Calia, Matera (IT)

(73) Assignee: ITALTRACTOR ITM S.P.A., Fraz. Calcara Di Crespellano (IT)

( * ) Notice: Subject to any disclaimer, the term of this patent is extended or adjusted under 35 U.S.C. 154(b) by 102 days.

(21) Appl. No.: 15/743,073

(22) PCT Filed: Jul. 10, 2015

(86) PCT No.: PCT/IT2015/000182
§ 371 (c)(1),
(2) Date: Jan. 9, 2018

(87) PCT Pub. No.: WO2017/009875
PCT Pub. Date: Jan. 19, 2017

(65) Prior Publication Data
US 2019/0078616 A1 Mar. 14, 2019

(51) Int. Cl.
*B62D 55/21* (2006.01)
*F16C 33/04* (2006.01)
(Continued)

(52) U.S. Cl.
CPC ............ *B62D 55/211* (2013.01); *B62D 55/21* (2013.01); *F16C 11/045* (2013.01); *F16C 33/046* (2013.01); *F16C 33/22* (2013.01); *F16G 13/06* (2013.01); *F16C 2202/04* (2013.01); *F16C 2202/08* (2013.01); *F16C 2208/10* (2013.01);
(Continued)

(58) Field of Classification Search
CPC ....... B62D 55/21; B62D 55/211; F16G 13/06; F16C 33/046; F16C 33/22; F16C 11/045
See application file for complete search history.

(56) References Cited

U.S. PATENT DOCUMENTS 2,621,981 A 12/1952 Schick
2,823,081 A 2/1958 Mayo
(Continued)

FOREIGN PATENT DOCUMENTS

CN 1395532 A 2/2003
CN 1497147 A 5/2004
(Continued)

OTHER PUBLICATIONS

International Search Report dated Apr. 8, 2016 re: Application No. PCT/IT2015/000182; 1-4; citing: U.S. Pat. No. 3,948,574 A, U.S. Pat. No. 4,199,199 A, U.S. Pat. No. 2,621,981 A, U.S. Pat. No. 4,764,035 A, DE 93 11 232 U1, U.S. Pat. No. 5,829,850 A.
(Continued)

*Primary Examiner* — Kip T Kotter
(74) *Attorney, Agent, or Firm* — Cantor Colburn LLP

(57) ABSTRACT

A chain joint assembly includes a pin integral with at least one respective first chain link and a bushing, integral with at least one respective second chain link. The pin and the bushing are coaxial.
  The bushing has a constant inside diameter.
  At least one elastic ring is interposed between the pin and the bushing. The at least one elastic ring is substantially aligned with the portion of bushing which is coupled to a respective second chain link.

13 Claims, 1 Drawing Sheet

(51) Int. Cl.
*F16C 11/04* (2006.01)
*F16C 33/22* (2006.01)
*F16G 13/06* (2006.01)

(52) U.S. Cl.
CPC ...... *F16C 2240/54* (2013.01); *F16C 2361/71* (2013.01)

(56) References Cited

U.S. PATENT DOCUMENTS

| | | | |
|---|---|---|---|
| 3,235,315 A * | 2/1966 | Schnacke | B62D 55/0887 277/366 |
| 3,948,574 A | 4/1976 | Baylor | |
| 4,199,199 A | 4/1980 | Granda | |
| 4,764,035 A | 8/1988 | Boyd | |
| 5,236,080 A * | 8/1993 | Baum | D06C 3/023 198/845 |
| 5,829,850 A | 11/1998 | Ketting et al. | |
| 6,485,116 B1 | 11/2002 | Oertley | |
| 6,846,051 B2 | 1/2005 | Bottom et al. | |
| 6,886,521 B2 * | 5/2005 | Hamada | C23C 14/0605 123/193.4 |

FOREIGN PATENT DOCUMENTS

| | | | |
|---|---|---|---|
| CN | 104159810 A | 11/2014 | |
| DE | 3629591 A1 | 3/1988 | |
| DE | 9311232 U1 | 9/1993 | |
| EP | 0608543 A1 * | 8/1994 | ........... B62D 55/205 |
| EP | 0608543 A1 | 8/1994 | |
| JP | 2003301887 A | 10/2003 | |
| RU | 2591859 C1 | 7/2016 | |
| SU | 652024 A1 | 3/1979 | |
| WO | 0216060 A1 | 2/2002 | |

OTHER PUBLICATIONS

Written Opinion dated Apr. 8, 2016 re: Application No. PCT/IT2015/000182; 1-6; citing: U.S. Pat. No. 3,948,574 A, U.S. Pat. No. 4,199,199 A, U.S. Pat. No. 2,621,981 A, U.S. Pat. No. 4,764,035 A, DE 93 11 232 U1, U.S. Pat. No. 5,829,850 A.

RU Office Action dated Jan. 25, 2019 re: Application No. 2018104968/11, pp. 1-8, citing: U.S. Pat. No. 4,199,199 A1, U.S. Pat. No. 3,948,574 A1, U.S. Pat. No. 4,764,035 A1, U.S. Pat. No. 5,829,850 A1, RU 2591859 C1 and SU 652 024 A1.

JP Office Action dated Jun. 4, 2019 re: Application No. 2018-500744, pp. 1-6, citing: JPS55-040384 A, JP H05-157143 A, JP 2003-301887 A and U.S. Pat. No. 3,948,574 A.

* cited by examiner

CHAIN JOINT ASSEMBLY

TECHNICAL FIELD

The present disclosure relates to a chain joint assembly.

BACKGROUND

A chain joint is a mechanical apparatus which is capable of connecting two structures (generally two shafts) while allowing their mutual motion; such movement can be rotating or oscillating.

"Flexible chain joints" are used to connect two transmission shafts in mutual axial alignment, and they are capable of absorbing any misalignment owing to an imperfect mounting and to the inherent irregularities of the rotation.

The loss of power absorbed by the chain joint is minimal, so much so that it can be considered negligible.

These joints do not replace universal joints and they are not designed to absorb angular or axial misalignments, but only the vibrations and plays that are generated during the rotation of two shafts which are coupled axially.

Maintenance and mounting are extremely simple and rapid.

The joint is composed of a pin connected to the first structure (substantially a first link of the chain) and of a bushing connected to the second structure (substantially a link of the chain).

The contact surfaces between the pin and the bushing transmit the mechanical load from one structure to the other (i.e. they couple the links rigidly).

When the joint is subjected to a load, the pin tends to bend, resulting in a concentration of the load on contact surfaces of reduced size (the load will substantially be applied on edges).

Reducing the contact surface (and therefore localizing the load) results in an increase in the wear of the parts affected, with consequent rapid degradation of the joint.

This condition determines the necessity of overdimensioning the joints (in particular the pins) in order to make the desired performance levels possible, while minimizing wear.

Alternatively, the joint can be used at lower speeds than the design speeds in all cases in which a load greater than a preset threshold value could be applied to the pin.

In any case, the worst risk that can be encountered in conventional joints is a stoppage caused by the breakage or wearing-out of the pin.

The prior art documents U.S. Pat. Nos. 6,485,116 and 6,846,051 by Caterpillar Inc. disclose technical solutions aimed at overcoming the above mentioned problems.

These solutions involve the adoption of special contoured bushings that minimize the phenomenon of wear, thanks to a better distribution of the loads.

Against this, these implementation solutions require the adoption of bushings that are complex to make: since these are components which are present in great numbers in the joint, such complexity of manufacture translates to a high overall cost of the end product.

SUMMARY

The principal aim of the present disclosure is to solve the above mentioned drawbacks, by providing a chain joint assembly which is adapted to correctly distribute loads.

Within this aim, the disclosure provides a chain joint assembly that is subject to low rates of wear.

The disclosure also provides a chain joint assembly which uses components that are simple to make.

The disclosure further provides a chain joint assembly which is constituted by components with a substantially different shape structure from conventional assemblies.

The present disclosure also provides a chain joint assembly that is low cost, easily and practically implemented, and safe in use.

These advantages and features which will become better apparent hereinafter are achieved by providing a chain joint assembly of the type comprising a pin, integral with at least one respective first chain link, and a bushing, integral with at least one respective second chain link, said pin and said bushing being coaxial, characterized in that said bushing has a constant inside diameter, between said pin and said loop there being interposed at least one elastic ring which is substantially aligned with the portion of bushing which is coupled to a respective second chain link.

BRIEF DESCRIPTION OF THE DRAWINGS

Further characteristics and advantages of the disclosure will become better apparent from the description of a preferred, but not exclusive, embodiment of the chain joint assembly according to the disclosure, which is illustrated by way of non-limiting example in the accompanying drawings wherein.

DETAILED DESCRIPTION OF THE DRAWINGS

Figure 1:
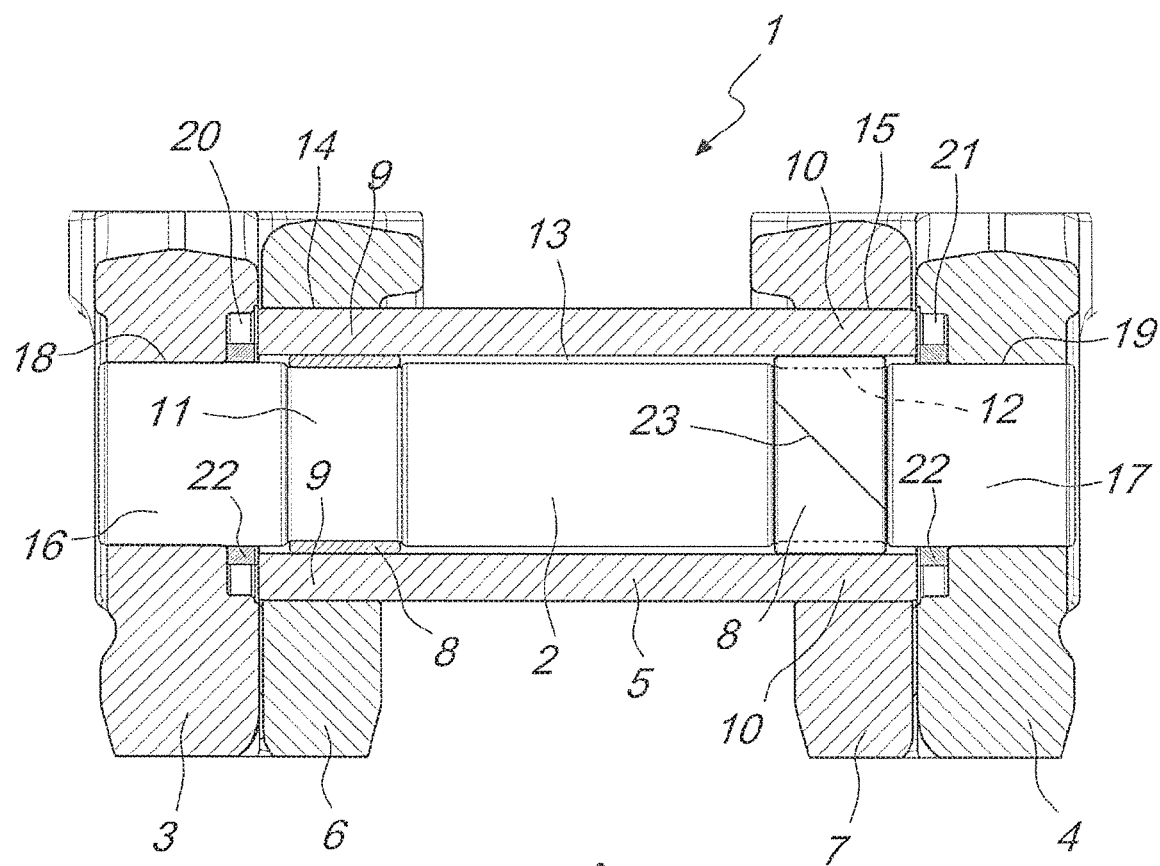
FIG. 1 is a cross-sectional front elevation view, taken along a longitudinal plane, of a chain joint assembly according to the disclosure.
Figure 2:
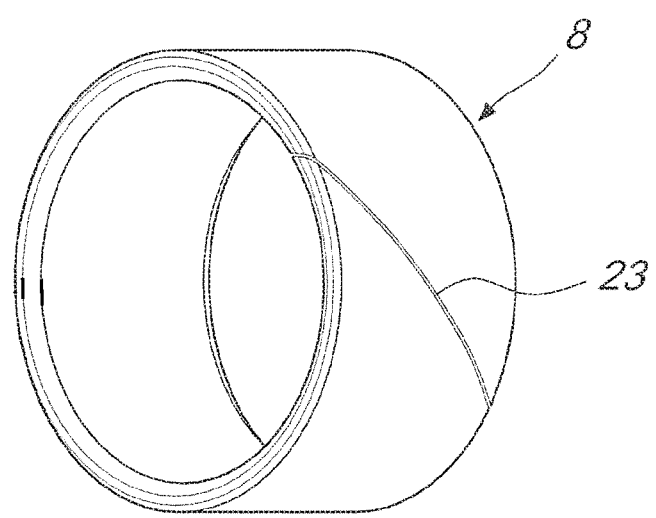
FIG. 2 is a perspective view of an elastic ring of a chain joint assembly according to the disclosure.

With reference to FIGS. 1 and 2, the reference numeral 1 generally designates a chain joint assembly.

The chain joint assembly 1 comprises a pin 2, which is integral with at least one respective first chain link 3, 4, and a bushing 5, which is integral with at least one respective second chain link 6, 7.

The pin 2 and the bushing 5 are coaxial and, in particular, the pin 2, in the configuration for use, is inserted in the inner cavity of the bushing 5.

The bushing 5 has a constant inside diameter.

In particular the bushing 5 can be constituted by a perfectly cylindrical body: this geometric characteristic makes it possible to manufacture it simply and inexpensively.

The economy of this type of bushings 5 translates, as a consequence, to an overall reduction of the costs of the joint assembly 1 which can comprise a number, possibly considerable, of bushings 5.

In addition, a cylindrical component, being substantially free from geometric and dimensional irregularities, is substantially free from fracture triggering points and this is particularly useful if the joint 1 is subjected to high mechanical loads.

It should be noted that, according to the disclosure, between the pin 2 and the bushing 5 there is interposed at least one elastic ring 8, which will be substantially aligned with the portion 9, 10 of the bushing 5 which is coupled to a respective second chain link 6, 7.

With particular reference to an embodiment that is particularly efficient and easy to assemble, the pin 2 comprises at least one respective region 11, 12 with reduced diameter for the stable accommodation of at least one respective elastic ring 8.

It will be possible to insert, in the assembly step, the elastic ring 8 on the pin 2, by forcing it to slide along it until it arrives at the respective region 11, 12, in which it will remain captive.

It should be noted that, according to the most advantageous embodiment in terms of implementation, the pin 2 will be integral with at least two respective, mutually opposite first chain links 3 and 4.

Similarly, the bushing 5 will also be integral with at least two respective second chain links 6, 7.

It should be noted that, in such case, the elastic rings 8 will be at least two in number, each one aligned with the portions 9 and 10 of the bushing 5 which are coupled to the respective second chain links 6, 7.

With particular reference to such embodiment, it should be noted that the pin 2 will therefore comprise at least two respective regions 11 and 12 with reduced diameter.

Each region 11, 12 will be intended to stably accommodate at least one respective elastic ring 8.

Such regions 11 and 12 will be aligned with the portions 9 and 10 of the bushing 5 which are coupled to the respective second chain links 6 and 7.

It is equally important to note that the inside diameter of each bushing 5 is greater than the outside diameter of the respective pin 2.

The annular chamber 13 defined between the bushing 5 and the pin 2 will therefore be adapted to accommodate a lubricant of the type of an oil, a grease and the like.

In this manner the parts which are subject to relative movement will always be correctly lubricated, thus minimizing friction and wear.

In order to ensure that the assembly of the joint 1 is stable and can therefore easily withstand the mechanical stresses that will occur during its use, the outside diameter of the bushing 5, at its portion 9, 10 which is integral with the respective second link 6, 7, is greater than the diameter of the respective accommodation hole 14, 15 present on the at least one second link 6, 7.

The portions 9, 10 of the bushing 5 will therefore be keyed by interference in the respective holes 14, 15 of the respective second link 6, 7.

Similarly, the outside diameter of the pin 2, at its part 16, 17 which is integral with the respective first link 3, 4, is greater than the diameter of the respective accommodation eyelet 18, 19 present on the at least one first link 3, 4.

The parts 16 and 17 of the pin 2 will therefore also be keyed by interference in the respective eyelets 18, 19 of the corresponding first link 3, 4.

It should further be noted that the at least one first link 3, 4, at its surface facing and proximate to the at least one second link 6, 7, comprises at least one seat 20, 21 for accommodating at least one bulkhead 22 for closing the annular chamber 13 defined between the bushing 5 and the pin 2.

If it is not necessary to provide a hermetic closure of the annular chamber 13, then the closure bulkhead 22 can be made of polymeric material (in particular polyurethane can be used) or made of metallic material (in particular steel can be used).

If it is necessary to provide the hermetic closure of the annular chamber 13 defined between the inside of the bushing 5 and the outside of the pin 2, then the at least one closure bulkhead 22 will be made of material of the type of an elastomer.

In addition to natural elastomers and synthesized polymeric elastomers, it should be noted that it is also possible to adopt silicone materials in order to provide bulkheads 22 intended to act as sealing gaskets.

In this case, thanks to the presence of the sealing bulkheads 22 it will be possible to maintain a preset quantity of lubricant in the annular chamber 13, thus favoring the sliding of the components in relative motion.

It should further be noted that each elastic ring 8 can preferably have an inside diameter which is substantially greater than the diameter of the respective region 11, 12 with reduced diameter in which it is accommodated and an outside diameter which is substantially less than the corresponding portion 9, 10 of bushing 5, coupled to a respective second chain link 6, 7, on which it abuts. The presence of this play will favor the relative movements, thus minimizing friction and wear. In addition, this play also enables a more even and regular distribution of the lubricant within the annular chamber 13, a characteristic that further minimizes friction and wear.

Each elastic ring 8, according to an embodiment that is particularly simple to assemble (which translates to an overall reduction of the costs of providing the joint 1), comprises a through slit 23.

Such slit 23 lies on a plane that is inclined, with respect to the axis of symmetry of the ring 8, at an angle substantially comprised between 30° and 60°: preferably slits 23 inclined at 45° will be adopted.

The presence of the slit 23, with the particular inclination indicated, results in a better distribution of loads on the ring 8, in particular in the neighborhood of said slit 23.

It should further be noted that each elastic ring 8, if the joint 1 in which it is installed is subjected to high mechanical loads, will have a surface hardness higher than 60 HRC (in particular, even higher than 62 HRC).

The HRC unit of measurement refers explicitly to the Rockwell hardness scale, in which the indenter (i.e. the tool with which it exerts the test pressure on the surface of the test piece) is a diamond cone, with an opening angle equal to 120°.

It should be noted therefore that the value of surface hardness of the ring 8 indicated previously is very high and is adapted to minimize the deformations of its surfaces when subjected to a mechanical load.

It should further be noted that the outer surface and the inner surface of each elastic ring 8 have a roughness lower than 0.3 millionths of a meter (preferably lower than 0.2 millionths of a meter). This characteristic contributes to increasing the slideability of such surfaces.

It should be noted that the portions 9 and 10 of the bushing 5 will protrude externally with respect to the elastic rings 8, defining two end tabs in a cantilever arrangement for the bushing 5: the elastic rings 8 will not be in contact with the ends of the respective bushing 5 but with a central part thereof, and this characteristic helps even out the distribution of the mechanical loads to which the joint 1 is subjected.

With particular reference to specific embodiments of the present disclosure, it should be noted that the elastic rings 8 can also have an outside diameter exceeding 4 m (larger radius of 2000 mm).

The joint assembly 1 thus provided offers an extremely high resistance to wear with respect to an assembly provided according to the current state of the art.

Moreover, the distribution of mechanical loads in the assembly 1 according to the disclosure occurs on greater surfaces of the pin 2, thus reducing the risk of concentrated loads. Furthermore the elastic ring 8, thanks to its geometry, is subjected to merely compression loads, therefore once it has been made with very high surface hardness values, it will be perfectly adapted to optimally withstand the forces that generate wear.

The construction configuration described further makes it possible to have a play between the pin 2 and the bushing 5 which is greater than in the conventional implementation solutions (by defining the annular chamber 13) thus making it possible to introduce a greater quantity of lubricant (usually oil) than that possible in conventional joint assemblies; this allows a more effective lubrication and a better removal of heat from the areas subjected to heavy loads.

Advantageously the present disclosure solves the problems described previously, by providing a chain joint assembly 1 that is adapted to correctly distribute loads: this is possible thanks to the presence of a bushing 5 with a constant inside diameter, elastic rings 8 with specific geometric and structural characteristics (described previously) and thanks to the play present between the pin 2 and the bushing 5, which defines an annular chamber 13 that can accommodate lubricant, thus favoring the equal division of loads (a consequence of the fact that sticking and friction will be substantially guarded against).

Conveniently, the chain joint assembly 1 according to the disclosure will therefore be subject to low rates of wear, and it is thus characterized by an average lifetime that exceeds that of conventional joints.

Conveniently, the chain joint assembly 1 adopts components that are easy to provide, making it possible to minimize the costs of production and of assembly of the joint 1.

Positively, the chain joint assembly 1 is constituted by components with a substantially different shape structure from conventional assemblies, thus enabling an immediate and clear identification of the specific product by customers.

Conveniently, the chain joint assembly 1 is characterized overall by low cost and is easily and practically implemented, which make it a joint assembly that is safe in use.

The disclosure, thus conceived, is susceptible of numerous modifications and variations. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The invention claimed is:

1. A chain joint assembly comprises a pin integral with at least one respective first chain link, and a bushing, integral with at least one respective second chain link, said pin and said bushing being coaxial, wherein said bushing has a constant inside diameter, between said pin and said bushing there being interposed at least one elastic ring configured to take up thrust between the bushing and the pin and substantially aligned with a portion of said bushing which is coupled to a respective second chain link, wherein said pin comprises at least one respective region with reduced diameter for stable accommodation of said at least one elastic ring, said at least one respective region is aligned with the portion of said bushing coupled to the respective second chain link, wherein said at least one first chain link, at a surface thereof facing and proximate to said at least one second chain link, comprises at least one accommodation seat for at least one gasket.

2. The chain joint assembly according to claim 1, wherein said pin is integral with at least two respective, mutually opposite first chain links, and said bushing is integral with at least two respective second chain links, said elastic rings being at least two in number, each one of said elastic rings being aligned with the portions of said bushing coupled to the respective second chain links.

3. The chain joint assembly according to claim 2, wherein said pin comprises at least two respective regions with reduced diameter, each one for the stable accommodation of at least one respective elastic ring, said regions being aligned with the portions of said bushing coupled to the respective second chain links.

4. The chain joint assembly according to claim 1, wherein the inside diameter of each said bushing is greater than the outside diameter of said pin, an annular chamber defined between said bushing and said pin accommodating a lubricant.

5. The chain joint assembly according to claim 4, wherein said gasket closes the annular chamber defined between said bushing and said pin.

6. The chain joint assembly according to claim 5, wherein said gasket is configured for the hermetic seal of said annular chamber, made of material of the type of an elastomer.

7. The chain joint assembly according to claim 1, wherein the outside diameter of said bushing, at its portion which is integral with the respective second link, is greater than the diameter of a respective accommodation hole disposed on said at least one second link, said bushing being keyed by interference in said hole of said at least one second link.

8. The chain joint assembly according to claim 1, wherein the outside diameter of said pin, at its part which is integral with the respective first link, is greater than the diameter of a respective accommodation eyelet disposed on said at least one first link, said pin being keyed by interference in said eyelet of said at least one first link.

9. The chain joint assembly according to claim 1, wherein each said at least one elastic ring has an inside diameter greater than a diameter of the respective region with reduced diameter in which it is accommodated and an outside diameter less than the corresponding portion of bushing, coupled to a respective second chain link, on which it abuts.

10. The chain joint assembly according to claim 1, wherein each said elastic ring comprises a through slit, said slit lying on an inclined plane with respect to an axis of symmetry of the ring, at an angle substantially comprised between 30° and 60°.

11. The chain joint assembly according to claim 1, wherein each said elastic ring has a surface hardness higher than 60 HRC, with reference to the Rockwell hardness scale in which an indenter is a diamond cone with an opening angle equal to 120°.

12. A chain joint assembly comprises a pin integral with at least one respective first chain link, and a bushing, integral with at least one respective second chain link, said pin and said bushing being coaxial, wherein said bushing has a constant inside diameter, between said pin and said bushing there being interposed at least one elastic ring substantially aligned with a portion of said bushing which is coupled to a respective second chain link, wherein said pin comprises at least one respective region with reduced diameter for stable accommodation of said at least one elastic ring, said at least one respective region is aligned with the portion of said bushing coupled to the respective second chain link, wherein the bushing comprises a portion protruding externally with respect to the at least one elastic ring and defining an end tab, the at least one elastic ring being not in contact with the end tab of the bushing and being in contact with a central part of the bushing.

13. A chain joint assembly comprises a pin integral with at least one respective first chain link, and a bushing, integral with at least one respective second chain link, said pin and said bushing being coaxial, wherein said bushing has a constant inside diameter, between said pin and said bushing there being interposed at least one elastic ring substantially aligned with a portion of said bushing which is coupled to a respective second chain link, wherein said pin comprises at least one respective region with reduced diameter for stable accommodation of said at least one elastic ring, said at least one respective region is aligned with the portion of said bushing coupled to the respective second chain link, wherein an outer surface of the at least one elastic ring is substantially parallel to an inner surface of the at least one elastic ring.

* * * * *